US012574327B2

(12) United States Patent
Hartsook et al.

(10) Patent No.: US 12,574,327 B2
(45) Date of Patent: Mar. 10, 2026

(54) ELASTIC OVERLAY NETWORK GENERATION

(71) Applicant: Cisco Technology, Inc., San Jose, CA (US)

(72) Inventors: Cody Hartsook, San Francisco, CA (US); John Parello, Campbell, CA (US); Tirthankar Ghose, Danville, CA (US); Giles Douglas Yorke Heron, London (GB); Felix Sebastian Kaechele, Alliston (CA)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 17/747,562

(22) Filed: May 18, 2022

(65) Prior Publication Data

US 2023/0379256 A1 Nov. 23, 2023

(51) Int. Cl.
| | |
|---|---|
| *H04L 47/127* | (2022.01) |
| *H04L 41/0895* | (2022.01) |
| *H04L 43/12* | (2022.01) |
| *H04L 45/00* | (2022.01) |
| *H04L 67/52* | (2022.01) |

(52) U.S. Cl.
CPC ........ *H04L 47/127* (2013.01); *H04L 41/0895* (2022.05); *H04L 43/12* (2013.01); *H04L 45/14* (2013.01); *H04L 67/52* (2022.05)

(58) Field of Classification Search
CPC ... H04L 47/127; H04L 41/0895; H04L 67/52; H04L 43/12; H04L 41/12; H04L 45/14; H04L 45/70
See application file for complete search history.

(56) References Cited

U.S. PATENT DOCUMENTS

| | | | | |
|---|---|---|---|---|
| 7,590,245 | B1* | 9/2009 | Levitan | H04L 63/0414 |
| | | | | 713/160 |
| 8,688,827 | B2 | 4/2014 | Gonzalez-Banos et al. | |
| 9,515,889 | B2 | 12/2016 | Wang et al. | |
| 2003/0167340 | A1* | 9/2003 | Jonsson | H04L 45/00 |
| | | | | 709/227 |
| 2007/0025363 | A1* | 2/2007 | Zhang | H04L 67/288 |
| | | | | 370/432 |

(Continued)

FOREIGN PATENT DOCUMENTS

CN 107786439 A 10/2020

*Primary Examiner* — Muhammad Raza
(74) *Attorney, Agent, or Firm* — Lee & Hayes, P.C.

(57) ABSTRACT

In one embodiment, a device obtains path probing data for paths between a set of network nodes wherein a first subset of the set of network nodes are operated by a provider of an online application or service and a second subset of the set of network nodes operated by affiliates. The device generates, based on the path probing data, a performance model of path performances between clients in different geolocations and the online application or service via each of the set of network nodes. The device determines, based on the performance model, a particular node in the second subset should be used as a point of presence for clients located in a particular one of the different geolocations to access the online application or service. The device configures a network overlay including the first subset and the particular node as points of presence for the online application or service.

14 Claims, 9 Drawing Sheets

(56)        References Cited

U.S. PATENT DOCUMENTS

| | | | | |
|---|---|---|---|---|
| 2008/0137653 | A1* | 6/2008 | Jonsson ................ | H04L 45/502 |
| | | | | 370/389 |
| 2010/0061231 | A1* | 3/2010 | Harmatos ............ | H04L 45/124 |
| | | | | 370/228 |
| 2011/0093599 | A1* | 4/2011 | Baratz .................. | H04L 67/104 |
| | | | | 709/228 |
| 2011/0225617 | A1* | 9/2011 | Rakib .................. | H04N 21/632 |
| | | | | 725/109 |
| 2012/0281560 | A1* | 11/2012 | Zourzouvillys ......... | H04L 43/55 |
| | | | | 370/252 |
| 2016/0143075 | A1* | 5/2016 | Tucker ............... | H04L 63/0823 |
| | | | | 370/329 |
| 2018/0219766 | A1 | 8/2018 | Michael et al. | |
| 2020/0106696 | A1* | 4/2020 | Michael ............... | H04L 45/125 |
| 2021/0250286 | A1 | 8/2021 | Norton et al. | |
| 2023/0239759 | A1* | 7/2023 | Yunoki ................ | H04W 36/14 |
| | | | | 455/414.1 |
| 2024/0129273 | A1* | 4/2024 | Majkowski ......... | H04L 61/5007 |
| 2025/0317826 | A1* | 10/2025 | Howe .................. | H04W 24/08 |

* cited by examiner

OVERLAY GENERATION PROCESS 248

TELEMETRY COLLECTOR 402

LINK DATABASE 404

AFFILIATE SEARCH ENGINE 406

NETWORK CONTROL AGENT 408

ELASTIC OVERLAY NETWORK GENERATION

TECHNICAL FIELD

The present disclosure relates generally to computer networks, and, more particularly, to elastic overlay network generation.

BACKGROUND

The Internet is a network made up of interconnected smaller networks. Applications and services may be provided across these networks. The resources making up the applications and services and the clients attempting to utilize those resources may be geographically dispersed across the networks. Accordingly, a client may access the geographically dispersed resources across a communication path through the interconnected networks. For example, a client may communicate packets to a geographically dispersed dedicated server of the application or service via a cross-domain network path.

Given the complexity of the connections between the interconnected networks of the Internet, multiple paths may exist between the client and the geographically dispersed resources of the application or service. Some of these paths perform better (e.g., less latency, less jitter, less packet loss, etc.) than others. In addition, some applications, such as low-latency non-buffered applications and services (e.g., multiplayer gaming, fintech, etc.), are particularly sensitive to the performance of a network path. Therefore, the performance of the network path utilized for accessing these applications and services can influence their performance.

To support access to an online application or service, many providers now establish points of presence (PoPs) at various geographic locations. However, to deploy hardware to a new location can be very time and resource intensive. In addition, traffic loads tend to vary over time and across different locations, meaning that simply deploying a new PoP to a particular location does not guarantee that doing so will result in optimized traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
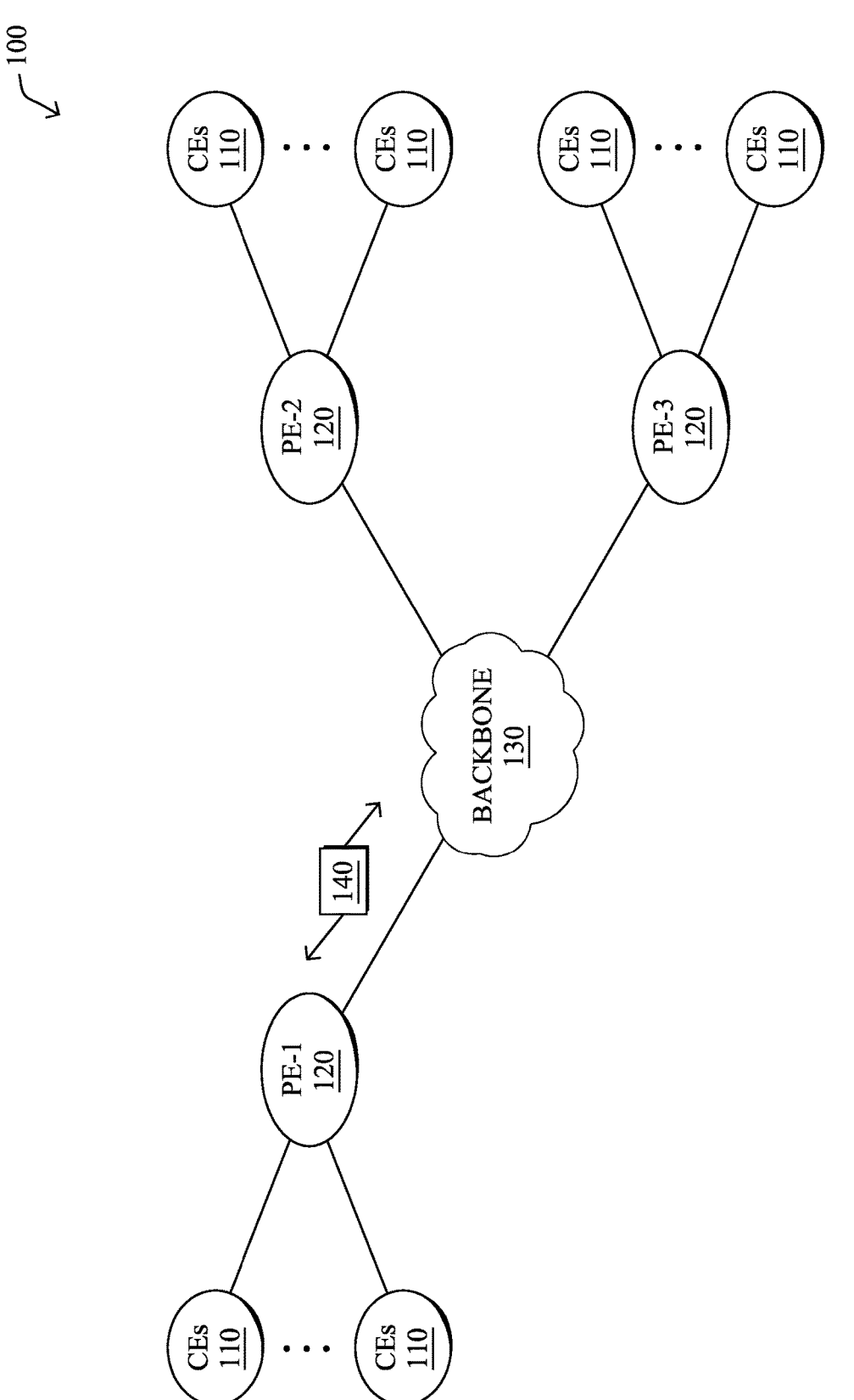
FIGS. 1A-1B illustrate an example communication network.

According to one or more embodiments of the disclosure a device obtains path probing data for paths between a set of network nodes wherein a first subset of the set of network nodes are operated by a particular entity that provides an online application or service and a second subset of the set of network nodes operated by one or more affiliate entities. The device generates, based on the path probing data, a performance model that models path performances between clients located in different geolocations and the online application or service via each of the set of network nodes. The device determines, based on the performance model, that a particular node in the second subset should be used as a point of presence for clients located in a particular one of the different geolocations to access the online application or service. The device configures a network overlay that includes the first subset of the set of network nodes and the particular node in the second subset as points of presence for the online application or service.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in computer network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to computer network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
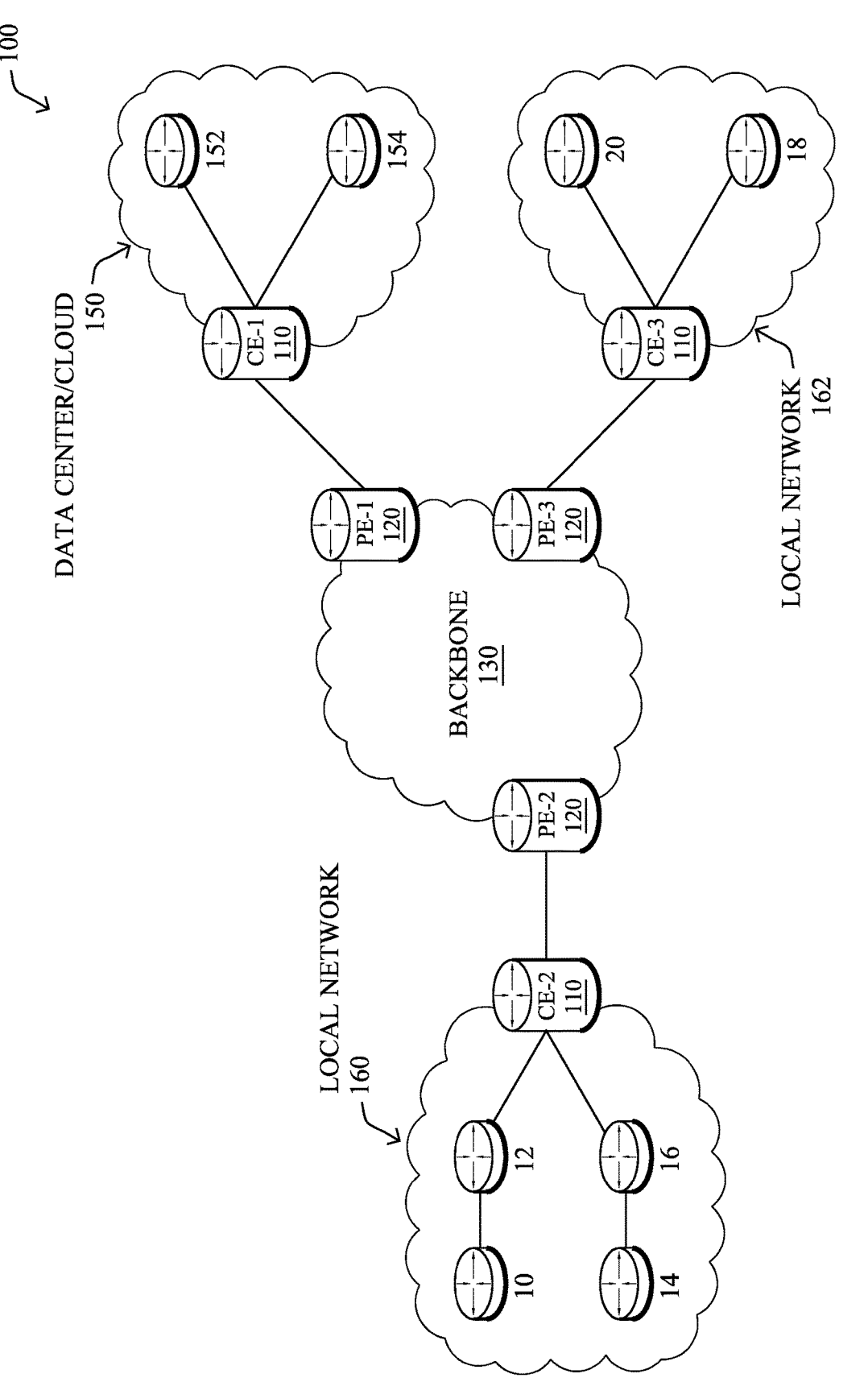

FIG. 1B illustrates an example of computer network 100 in greater detail, according to various embodiments. As shown, network backbone 130 may provide connectivity between devices located in different geographical areas and/or different types of local networks. For example, computer network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, computer network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in computer network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
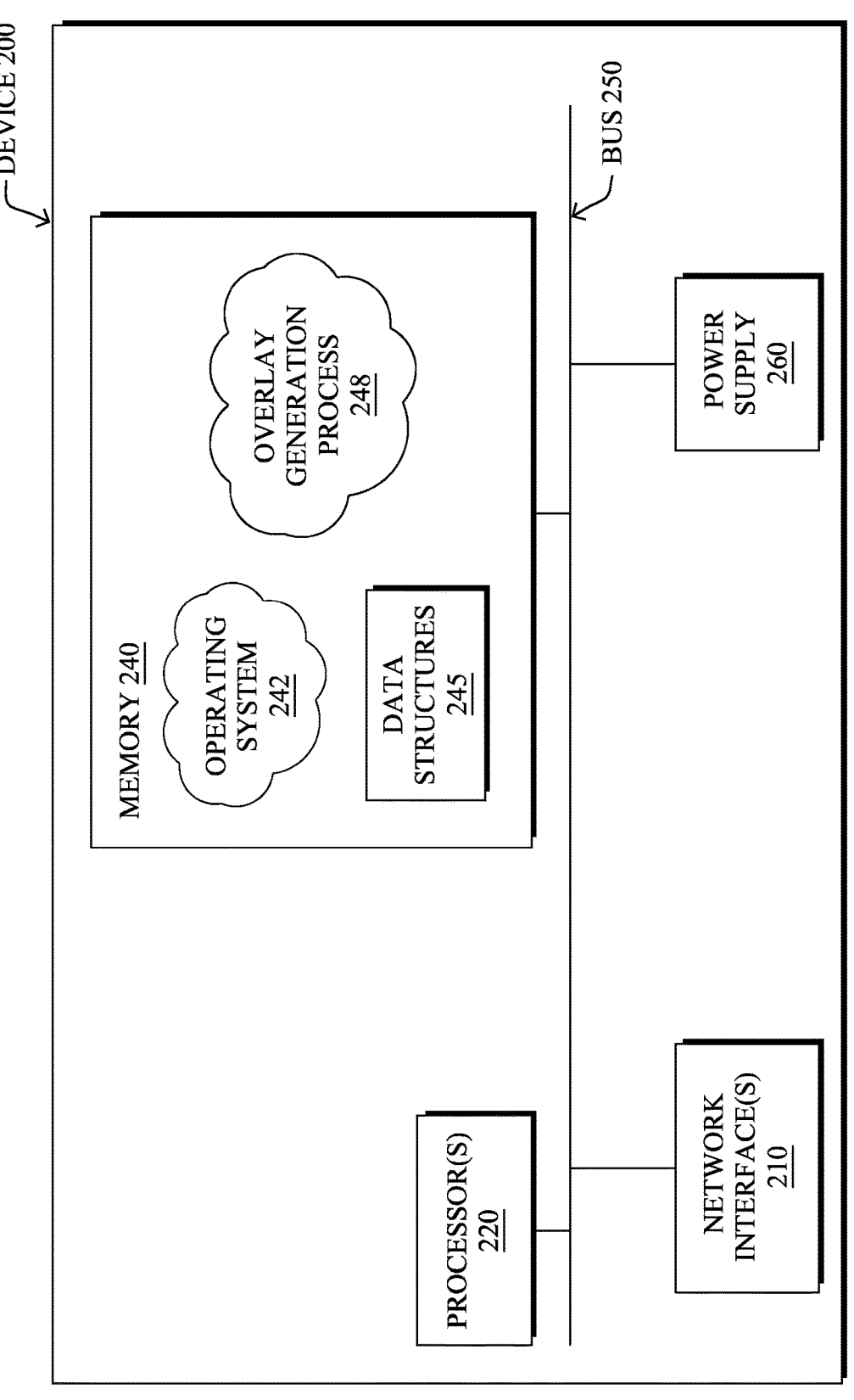
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of computer network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the computer network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an overlay generation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, overlay generation process 248 may also include computer executable instructions that, when executed by processor(s) 220, cause device 200 to perform the techniques described herein. To do so, in some embodiments, overlay generation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, overlay generation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry and/or path performance data that has been labeled as being indicative of a path performance level. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that overlay generation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether a network path will exhibit a better network path performance than another network path. In such a case, the false positives of the model may refer to the number of times the model incorrectly predicted that the particular network path will exhibit a better network path performance than another network path. Conversely, the false negatives of the model may refer to the number of times the model incorrectly predicted that the path would exhibit a better network path performance than another network path. True negatives and positives may refer to the number of times the model correctly predicted that the network path would not or would exhibit a better network path performance than another network path, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
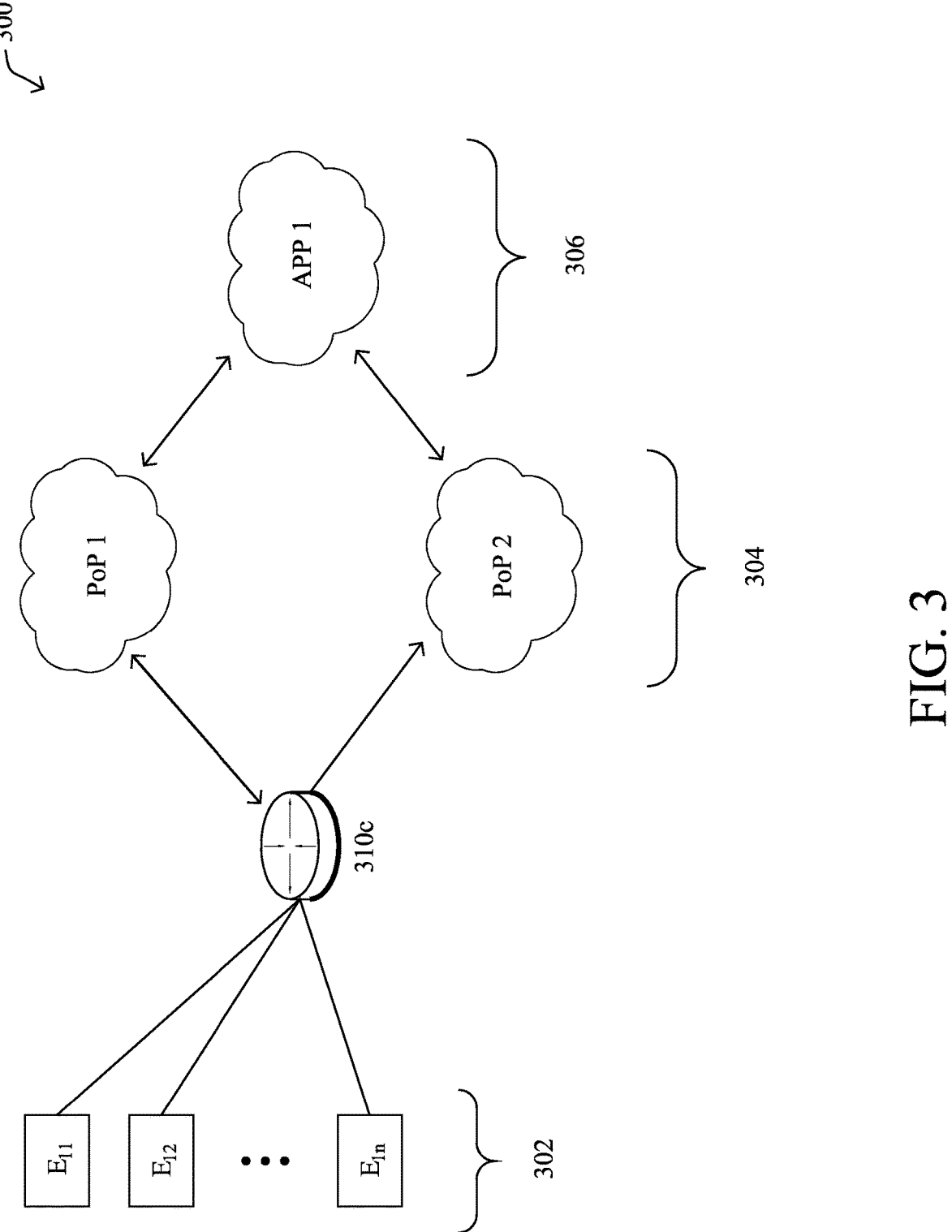
FIG. 3 illustrates an example of an edge router connecting to a cloud-hosted application via multiple points of presence (PoPs)

FIG. 3 illustrates an example 300 of an edge router 310*c* accessing a cloud-hosted application or service 306. As shown, assume that there are n-number of endpoints 302 at a particular location for which edge router 310*c* provides external connectivity. An online application or service provider may maintain any number of PoPs 304 to which edge router 310*c* may connect. Accordingly, edge router 310*c* may access a cloud-hosted application or service 306, such as a SaaS application, via a first PoP among PoPs 304, a second PoP among PoPs 304 etc.

However, the network performance when accessing the cloud-hosted application or service 306 via. PoPs 304 is not guaranteed. Indeed, ensuring that traffic SLAs are met may require adjustments:

To meet SLAs, exceptions might be required for traffic that should not be sent through the gateway but directly sent via Direct Internet Access (DIA) locally, in case the gateway is not able to provide a good enough performance for a specific kind of traffic, which highly depends on Peering between the Online application or service provider Gateway PoP and SaaS provider or intermediate Autonomous Systems (AS). For instance, it is sometimes recommended to send out VoIP traffic directly DIA to achieve better performance. However, this defeats the purpose of delivering WAN and security directly in the cloud while relying only on a very simple unique tunnel from all locations.

Selection of the "closest PoP" is usually based on either geo-location, AnyCast (e.g., for secure web gateways relying on HTTPS proxies), probing results (e.g., selecting the PoP with the lowest latency), or by fixing a static PoP location (e.g., as is usually done when setting up fixed IPsec tunnels). However, online application or service providers tend to have rather dense sets of PoPs to which a location can connect. Thus, the closest PoP is not always the best one to use, in terms of providing the best possible application experience. In particular, a PoP might be struggling at certain times of the day to satisfy the SLA of the application traffic, while other nearby PoPs might not.

The performance of a given PoP can also vary between applications. Indeed, performance can be influenced by any or all of the following factors:

Edge to PoP.

PoP load.

PoP to PoP, if traffic is sent through a backbone.

PoP to SaaS. Different PoPs might have different types of inter-connect or peering with SaaS services, and might end up going to different SaaS physical endpoints, even if the SaaS exposes a single logical endpoint.

As noted above, existing cross-domain network path selection mechanisms do not necessarily identify or even consider which network path or paths are the optimal path for accessing a particular application or service. Instead, path selection is driven by peering agreements, based on reciprocity and business goals, which prioritize cheaper paths with preferred partners over paths exhibiting a best performance for the specific application or service being accessed. Likewise, while the Border Gateway Protocol (BGP) can be utilized to discover and rank all the paths from an autonomous system, BGP also does not take dynamic path performance parameters (e.g., latency, jitter, packet drops, etc.) into account when prioritizing network paths. As a result, in the public Internet, which is arguably the best-connected mesh available and, in theory, could provide the most direct path, most congestion-free, best performing, and hence the closest to "speed of light in fiber" path on a global scale, there is no existing mechanism to perform a performance-based prioritization of network paths.

Instead, application and service providers have resorted to the costly exercise of leasing, purchasing, and maintaining real-estate and network hardware to establish their own network of geographically dispersed PoPs in an attempt to reduce the performance limitations imposed by suboptimal network path utilization. The cost of achieving and maintaining the breadth and interconnectivity involved in application or service access for a globally dispersed client base by establishing a geographically dispersed network of PoPs in this manner is often prohibitively expensive.

——Elastic Overlay Network Generation——

The techniques herein introduce an elastic overlay network and the mechanism for generating it. In some aspects, the elastic overlay may utilize strategically placed relays for cross-domain path optimization to handle the demands of low-latency, non-buffered applications. These strategically placed relay points may aid in steering network traffic along desired paths, effectively bypassing congestion and suboptimal routing decisions. In further aspects, the elastic overlay network may be generated by constructing layer-two tunnels that traverse the strategically placed relays. The elastic overlay network may provide increased application or service quality of experience for latency-sensitive application domains utilizing a network overlay on top of existing PoPs operated by network presence affiliates. The elastic overlay network may be structured elastically through dynamic updating of network topology. As a result, the elastic overlay network described herein may provide establish and elastically maintain a substantial network presence with optimized data routing quickly and with a low capital expenditure.

Illustratively, the techniques described herein may be performed by hardware, software, and/or firmware, such as in accordance with overlay generation process 248, which may include computer executable instructions executed by the processor 220 (or independent processor of interfaces 210) to perform functions relating to the techniques described herein.

Specifically, according to various embodiments, a device obtains path probing data for paths between a set of network nodes wherein a first subset of the set of network nodes are operated by a particular entity that provides an online application or service and a second subset of the set of network nodes operated by one or more affiliate entities. The device generates, based on the path probing data, a performance model that models path performances between clients located in different geolocations and the online application or service via each of the set of network nodes. The device determines, based on the performance model, that a particular node in the second subset should be used as a point of presence for clients located in a particular one of the different geolocations to access the online application or service. The device configures a network overlay that includes the first subset of the set of network nodes and the particular node in the second subset as points of presence for the online application or service.

Figure 4:
FIG. 4 illustrates an example architecture for generating an elastic overlay network.
Figure 4:
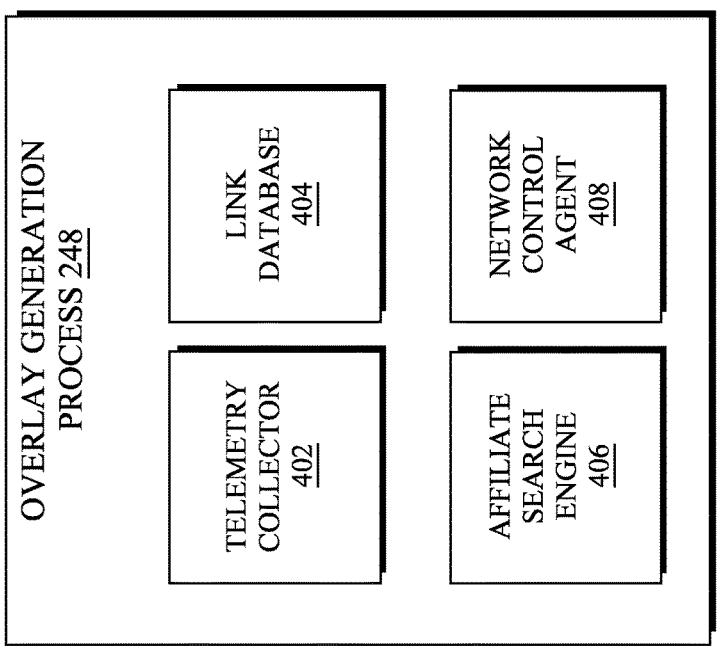

Operationally, FIG. 4 illustrates an example architecture 400 for generating an elastic overlay network, according to various embodiments. At the core of architecture 400 is overlay generation process 248, which may be executed by a controller for a network or another device in communication therewith. For instance, overlay generation process 248 may be executed by a controller for a network, a particular networking device in the network (e.g., a router, etc.), another device or service in communication therewith, or the like. In further embodiments, architecture 400 may be implemented as part of an online application or service network deployment.

As shown, architecture 400 may include any or all of the following components: a telemetry collector 402, a link database 404, an affiliate search engine 406, and/or a network control agent 408. As would be appreciated, the functionalities of these components may be combined or omitted, as desired. In addition, these components may be implemented on a singular device or in a distributed manner, in which case the combination of executing devices can be viewed as their own singular device for purposes of executing overlay generation process 248.

During execution, telemetry collector 402 is responsible for obtaining path probing data for the network paths between various network nodes defining network paths. Specifically, telemetry collector 402 may collect the telemetry data for each of the potential network paths between a client, a provider of an application or service, and/or the relays therebetween. The telemetry data may be used by overlay generation process 248 for generating a path performance model, in various embodiments. Generally, such telemetry data may be data indicative of the tunnel/path health, PoP associations with their various clients, and the attributes of those clients. In some embodiments, telemetry collector 402 may collect any or all of the following information:

PoP association: There might be multiple interfaces or tunnels on the router that is connected to multiple PoPs. For example, an edge router may have two different interfaces, and two tunnels (e.g., Tunnel1 and Tunnel2), with each connected to a different PoP (e.g., Tunnel1 connects to a PoP in Singapore, and Tunnel2 connects to a PoP in Hong Kong).

Probe data: The routers may employ the use of custom probes to send to their PoPs that measure network metrics such as loss, latency, jitter, delay, etc., to different online applications via multiple tunnels/paths. In one embodiment, this data is collected and stored in public or private network probe data-lakes for retrieval by telemetry collector 402. In further cases, the probe data may be obtained from passive systems tracking network metrics (e.g., crowd sourced systems of probes running ping and trace route tests such as Ripe Atlas, Megaport latency API, ThousandEyes, etc.) and/or vendors which can share application path performance metrics via API (e.g., Cisco Webex, AppDynamics, Microsoft Teams, Zoom, Google Talk, etc.). In some embodiments the probes and/or their resulting probe data may be one-way measurements. For example, the probes may produce probe data that differentiates between the performance of a network path carrying data in a first direction verses the performance of the network path carrying data in a second direction.

Application or NetFlow Data: This information may include data-plane traffic statistics observed on these tunnels. For example, NetFlow data can be collected as to how many clients or users there are, the applications to which they connect, etc.

Application Experience Metric(s): Some applications (e.g., Office365) may provide information indicative of an application experience metric, which could be on a per-session basis and associated with a particular router. For example, with Microsoft Informed Network Routing, Office365 can send application experience statistics such as {Good, Bad, Degraded, No-opinion} periods for the various Office365 applications (e.g., SharePoint, Teams, etc.) from a particular router interface. In one embodiment, these could be collected and stored in a datalake for retrieval by telemetry collector 402. In further cases, the application experience metric(s) could also be obtained from passive systems tracking network and application communication (e.g., LiveAction, DataDog, Cisco Routers with Application Response Time Netflows) and/or vendors which can share application performance data via API (e.g., Cisco Webex, AppDynamics, Microsoft Teams, Zoom, Google Talk, etc.). In one embodiment, all of those different metrics are normalized and used as a proxy to application experience score.

Local Interface Information: Local metrics (specific to an interface) may be obtained for each tunnel/path so as to track potential local issues (congestion) at the interface level that could explain the cause of potential delays that are not related to the PoP being used. Other local information may include memory utilization metrics, CPU utilization metrics, queue metrics, interface down events, rekey exchange failures, crash log information, or the like.

Other Metadata: In addition to the above data, other forms of data such as the geolocation of the router, geolocation of the PoPs, service provider associations (e.g., for a given public IP) can also be obtained by telemetry collector 402. In another example, the metadata may also be indicative of device attributes of the clients, such as their makes, models, software versions, browser information, or the like.

Telemetry collector 204 may, as described above, collect path probing telemetry data for paths between a wide variety of network nodes. Some of these network nodes may be network nodes that are, at the time of probing, not utilized as a communication path for a particular application or service and/or are operated by entities outside the control of the entity providing the particular application or service. For example, telemetry collector 204 may collect path probing telemetry data from a first subset of network nodes that are operated by a particular entity that provides an online application or service and/or from a second subset of network nodes operated by one or more third-party affiliate entities.

In various embodiments, link database 404 may be responsible for storing and/or structuring the path probing data collected by telemetry collector 402. Link database 404 may, for example, be deployed as a query-able structured data storage location for the path probing data. Link database 404 may generate and/or store a path performance model that models the path performances between clients located in different geolocations and the online application or service for which a path is being optimized via each of the network nodes described above. Path performances may include a latency associated with sending packets over the path, an amount of packet loss associated with sending packets over the path, an amount of delay associated with sending packets across the path, an amount of jitter associated with sending packets across the path, and/or any other quality of experience (QoE) metric for the path.

Each network probe measurement collected by or through telemetry collector 204 may be structured and stored in link database 404. For example, the probe measurements may be normalized to a common json format containing source coordinates, destination coordinates, and a round trip time (RTT) value for incorporation in link database 404. In the case where a network probe's source and destination values are Internet Protocol (IP) addresses, An IP-geolocation tool may be utilized to map to geo-coordinates for incorporation in link database 404. The network probe data may be uploaded to link database 404 where it may be stored as, for example, a time-series and graph database.

A performance model may be generated from the data in link database 404. The performance model may utilize the path probing data to model path performances between clients located in different geolocations and an online application or service provider across each of the network nodes operated by the entity operating the application or service and each of the network nodes operated by a third-party affiliate entity.

For example, to generate a performance model a query may be generated on top of the link database 404, which utilizes the path probing data to estimate latency between any two locations in a network. A geo-latency query may be structured as follows; given source coordinates and destination coordinates, a radius-nearest-neighbor search is performed on the source and destination. The results in the set of all probes include those whose source is within R radius of the given source and whose destination is within R radius of the given destination. This set of probes may then be consolidated to a single expected round trip time (RTT) value by taking the median or temporally weighted median. This query can then be performed for all populous regions and cached for later use. While the latency example is provided for illustrative purposes, queries directed to metrics such as packet loss, jitter, and/or other QoE metrics may be utilized in order to optimize for those particular metrics.

Affiliate search engine 406 may be responsible for part or all of an overlay fitting process based on the performance model from link database 404. For instance, affiliate search engine 406 may determine, based on the performance model from link database 404, that a network node operated by a third-party affiliate entity should be utilized as a relay location (e.g., PoP) for clients in a particular geolocation (e.g., geographical location, geographical radius around a location, site, latitude, longitude, city, metropolitan area, region, country, service provider, etc.) to access the online application or service. In other words, given all possible relay locations (PoPs) within a network, affiliate search engine 406 may be utilized to determine a strategic set of relays and the links between them (e.g., an overall) which may include relays and links operated by third-party affiliate entities.

The strategic set of relays and links selected may be those relays and links within the network that facilitate a relative network performance gain over, for example, an existing set of relays and links utilized to access the application or service and/or relative to other relays and links in the set of all possible relay locations and links available to access the application or service. For example, affiliate search engine 406 may identify a network node, operated by a third-party affiliate entity, to be utilized as and/or incorporated into a strategic set of relays and links such that its use/incorporation minimizes relay deployments while ensuring the lowest possible latency to clients accessing an application or service. Again, while this example is directed to latency, the network node that optimizes for packet loss, jitter, and/or other QoE metrics may similarly be selected.

In some embodiments, the overlay fitting process, including the selection of the third-party affiliate entity-operated node to be used as a PoP for clients located in a particular geolocation to access the online application or service, may be performed dynamically and/or recursively so that the strategic set of relays and links utilized to access the application is dynamically adjusted to account for changing network conditions.

For example, the overlay fitting process may be performed dynamically in response to client load. As clients join the system and their geo-locations are resolved as well as the geolocation of the application or service utilizing IP-geolocation tools, device location services, latency triangulation, etc. To reduce the impact of acute subscriber churn while still adapting to significant changes in load, a load attribute may be utilized by affiliate search engine 406 in selecting nodes. When a client load exceeds a predefined client load threshold, then particular nodes in a network path may be selected for deployment in the overlay. Conversely, when a client load drops below a predefined client load threshold, then particular nodes in a network path may be deselected and/or removed from deployment in the overlay.

Finally, architecture 400 may include network control agent 408, which is responsible for configuring the network overlay resulting from the fitting process performed by affiliate search engine 406. Configuring the network overlay may include provisioning the strategic set of relays including nodes operated by the application or service provider and those nodes operated by third-party affiliates, as selected by affiliate search engine 406. The network overlay may be configured and reconfigured periodically, continuously, and/or recursively, such that the network overlay is elastic and is dynamically shaped by network conditions.

In various embodiments, network control agent 408 may deploy third-party affiliate operated relay links by submitting provisioning requests to the third-party affiliate entities. In some examples, the third-party affiliate entities may be application programming interface (API) driven, and provisioning one of their relay links may include submitting an automated http request to the interface. In some embodiments, network control agent 408 may include a cloud-based provisioning controller which manages the state of the deployed overlay and sends the provisioning requests to third-party affiliate APIs when needed.

Network control agent 408 may deploy the overlay utilizing point-to-point connectivity services, creating a virtual circuit or tunnel (e.g., ethernet private line, etc.) between a source location (e.g., a relay node or endpoint) and a destination location (e.g., another relay node or endpoint). The virtual circuits and metadata may be stored using Elastic stack (ELK) for quick text-based retrievals. Again, the overlay may be deployed and redeployed periodically, continuously, and/or recursively, such that the network overlay is elastic and is dynamically shaped by network conditions.

Figure 5:
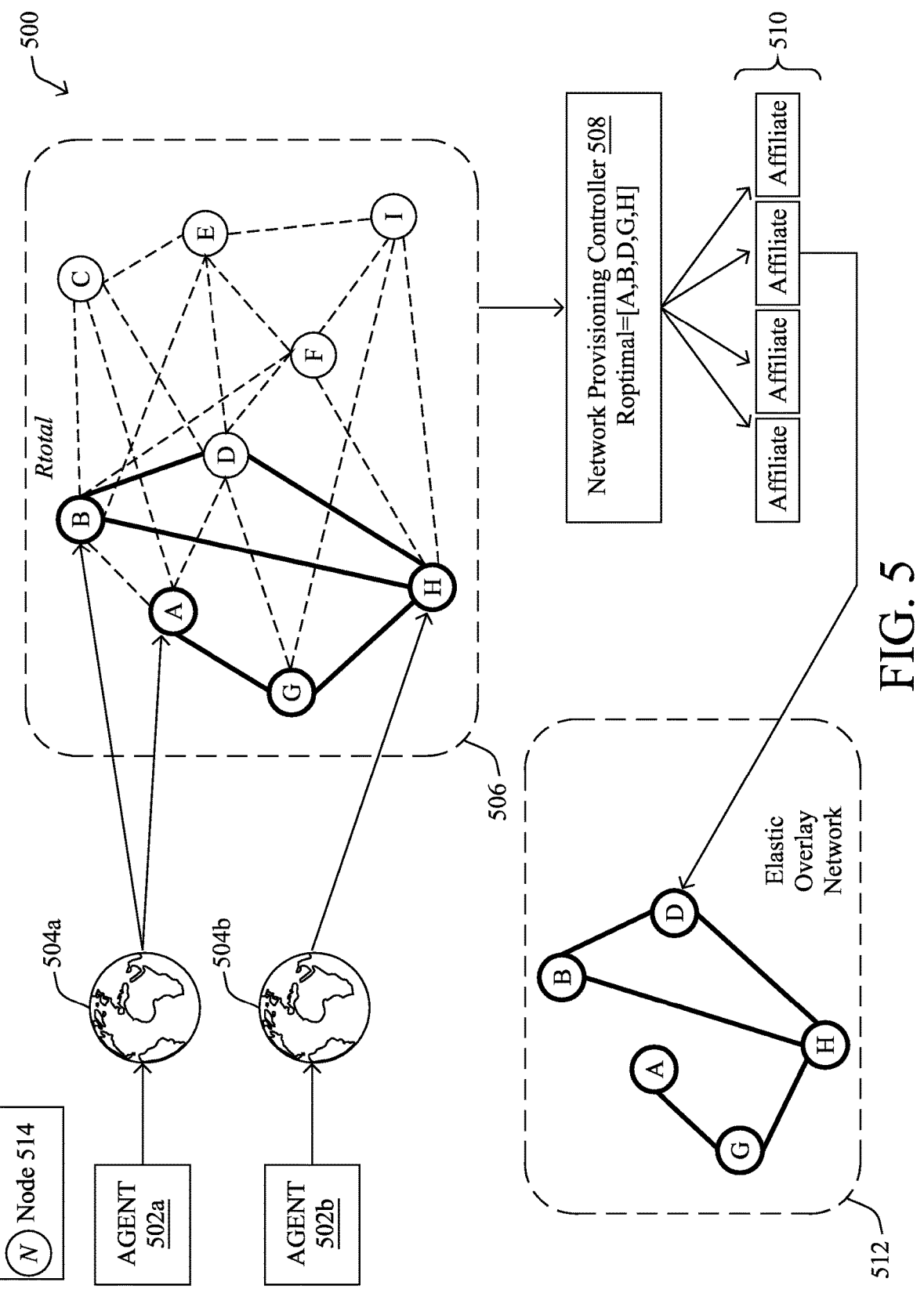
FIG. 5 illustrates an example mechanism for generating an elastic overlay network.

FIG. 5 illustrates an example mechanism 500 for generating elastic overlay network 512, according to various embodiments. As detailed above, generating elastic overlay network 512 may involve obtaining path probing data for paths between a set of network nodes including nodes operated by an online application or service provider and nodes operated by a third-party affiliate and utilizing that data to generate a network performance model 504.

As detailed above, public and private network probe data-lakes may be analyzed to build a network performance model 504. Network performance model 504 may model network performance of each of the network nodes and paths between a client and an application or service provider. Network performance model 504 may model, for example, of global latency, packet loss, jitter, other QoE metrics, etc. Network performance model 504 may include a model of the network path performance of all possible nodes 514 (e.g., relay locations, PoPs, etc.) and/or their links for connecting a client to an application or service across the network. All possible nodes 514 may be defined as Rtotal 506, which may include nodes 514 operated by an application or service provider that a client is seeking to access and/or nodes 514 operated by a third-party affiliate.

Proceeding with a global latency modeling example, a geo-latency query may be defined on top of a database containing the path probing data to estimate the latency between any two locations in the network of all possible nodes Rtotal 506. This query may produce an RTT for the set of all probes whose source is within R radius of the given source and whose destination is within R radius of the given destination.

Utilizing network performance model 504, modeling the network performance for each of the possible nodes and their links in Rtotal 506, network provisioning controller 508 may determine the optimal route or routes between a client and an online application or service. The optimal route or routes may be the route or routes that, based on performance model 504, provide a relative best network performance when used to access the application or service. Extending the latency example, the optimal route or routes may be the route or routes that provides the relative least amount of latency when used to access the application or service. Of course, the optimal route may alternatively or additionally be the route or routes that provide the relative least packet drop, least jitter, highest QoE, etc. when used to access the application or service.

The optimal rout or routes may be included in a strategically selected set of relay nodes 514 and the links between them, defines as Roptimal, to be utilized as part of elastic overlay network 512. Roptimal may be defined from all Relay_port→virtual circuit→Relay-port network edges.

The set of nodes 514 selected for Roptimal may be a function of the optimized for regional routes between the clients and the application or service. Calculating an optimal route may produce a path whose edges are deployable virtual circuits E Roptimal. For example, the fitting process to determine Roptimal may involve, for each epoch, defining which regional routes are being optimizing for. This can be done statically or dynamically. Subsequently, an Roptimal topology may be built from a nil graph or pruned from the set Rtotal 506.

For example, Rtotal 506 may include an initial topology state representing the mesh of all nodes 514 and the links between them. Some of those nodes (e.g., Node A, Node B, Node G, and Node H) may already be in an existing version of the Roptimal and/or its overlay network and others (e.g., Node C, Node D, Node E, Node F, and Node I) may not be in an existing version of the Roptimal and/or its overlay network. For each regional route, a calculation may be performed to determine the shortest path or paths (A*Algorithm) from the source to the destination. However, in order to add greater path diversity, a calculation may be performed to determine the K-shortest paths.

This computation may return a set of paths Roptimal containing the strategic relay nodes (e.g., Node A, Node B, Node D, Node G, and Node H). For reach relay node in the computed shortest paths Roptimal, the relay link including that node may be deployed as a virtual circuit in elastic overlay network 512 if it was not previously present in an existing Roptimal (e.g., the relay link represented by Node D). Conversely, any relay link from Rtotal 506 that is not present in the computed shortest paths Roptimal may be ignored (e.g., the links associate with Node C, Node E, Node F, and Node I).

As detailed above, the overlay fitting process may be done dynamically in response to client load. For instance, to reduce the impact of acute subscriber churn while still adapting to significant changes in load, a load attribute may be added to the shortest path calculation. In some embodiments, once a condition Rtotal[path] [load] >=Lthreshold for a predefined load threshold is satisfied, then each relay link from Roptimal is deployed in elastic overlay network 512. Conversely, as a client load for an application or service drops, satisfying the condition Rtotal[path] [load]<Lthreshold, then each relay link will be removed from the elastic overlay network 512 if it is in Roptimal. Therefore, the elasticity of elastic overlay network 512 may be defined by a value of Lthreshold. For example, with a Lthreshold value of 1, each client may be guaranteed an optimal path to their application or service. By employing this elasticity, a cost savings may be realized. For example, utilizing third-party affiliate PoPs as nodes 514 in elastic overlay network 512 may be associated with an increased cost. However, by conditionally utilizing the third-party affiliate PoPs based on a network condition such as client load, the network topology of elastic overlay network 512 may be dynamically adapted to the demands of the application or service without holding idle presence, thereby mitigating the increased cost.

Generating elastic overlay network 512 may include deploying the relay links that are specified in the Roptimal. and/or that satisfy any conditions to their deployment (e.g., reaching a network condition threshold such as client load). Deploying a relay link may include creating an overlay tunnel acting as a virtual circuit (ethernet private line) between a source location (Node 514, client endpoint, etc.) and a destination location (Node 514, application or service endpoint, etc.). Network provisioning controller 508 may manage the state of Roptimal and the relay link deployment by sending requests to third party affiliates 510 to provision the virtual circuit for use in elastic overlay network 512. Network provisioning controller may store the provisioned virtual circuits and metadata for future retrieval.

With respect to elastic overlay network 512 utilization, lightweight tunnel agents 502 may be executed at the client-side and/or application or service-side. For example, to on-ramp clients into elastic overlay network 512, client-side lightweight tunnel agent 502a may execute on the client-side. Operating similarly to unencrypted virtual private network clients, client-side lightweight tunnel agent 502a may obtain a list of overlay tunnels available from network provisioning controller 508. The client-side lightweight tunnel agent 502a may create a virtual tunnel interface for each overlay tunnel paths. Packets from the client may traverse the virtual tunnels of elastic overlay network 512 reaching an application or service-side endpoint. Application or service-side lightweight tunnel agent 502b may execute at the endpoint to process and deliver the packets received at the end of the tunnels.

Figure 6:
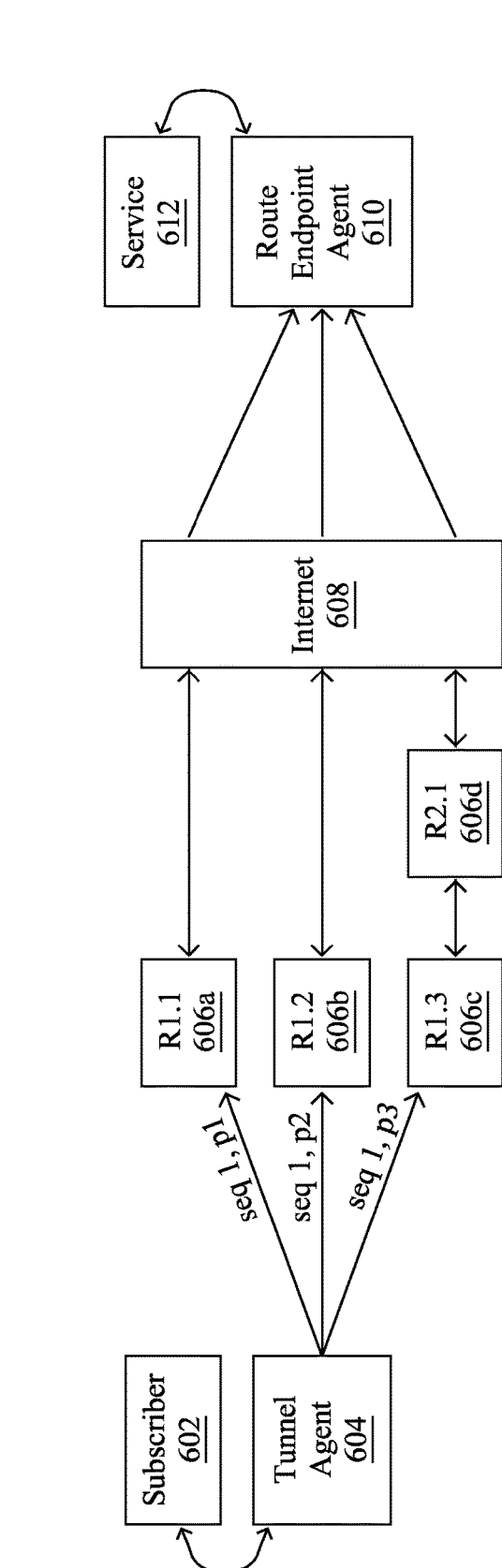
FIG. 6 illustrates an example mapping of multiple overlay tunnels for generating an elastic overlay network.

FIG. 6 illustrates an example mapping 600 of multiple overlay tunnels for generating an elastic overlay network, according to various embodiments. Specifically, mapping 600 illustrated a multiple overlay tunnel configuration for multi-tunnel packet replication. In mapping 600, subscriber 602 is communicably coupled to service 612 via multiple overlay tunnels. Each overlay tunnel includes a unique relay link configuration through which packets can traverse the internet 608 to arrive at their destination. For example, a first overlay tunnel includes a virtual circuit formed between the client-side tunnel agent 604 and the route endpoint agent 610 through relay R1.1 606a. A second overlay tunnel includes a virtual circuit formed between the client-side tunnel agent 604 and the route endpoint agent 610 through relay R1.2 606b. A third overlay tunnel includes a virtual circuit formed between the client-side tunnel agent 604 and the route endpoint agent 610 through relay R1.3 606c and relay R2.1 606d.

As detailed above, the client-side tunnel agent 604 may obtain a list of this set of multiple overlay tunnels from a network provisioning controller. A packet stream may be replicated across the set of multiple overlay tunnels, thereby ensuring an optimal path is being utilized without needing to discover the precise optimal path at every epoch.

In various embodiments, a client-side tunnel agent 604 and/or the application or a service-side route endpoint agent 610 may create virtual tunnel interfaces for each overlay tunnel path. An internal lightweight UDP proxy may be utilized to replicate UDP traffic from a listening port to the virtual tunnel interfaces. A redirect IP-table rule may be utilized to steer traffic to the listening port. Additionally, rule filters may be added to direct specific outbound packets to the proxy, allowing all other traffic to exit a default interface.

When replicating packet streams across multiple tunnels, duplicate packets from the stream may arrive at application or service-side route endpoint agent 610 and/or client-side tunnel agent 604. In some instances, application or service 612 and/or subscriber 602 may be idempotent and be able to perform duplicate packet filtering without interruption. However, in instances where the application or service 612 and/or subscriber 602 is not idempotent, sequence numbers may be inserted during the packet stream replication and consolidation process. Upon ingress packets in the packet stream may be filtered by sequence number before delivering them to the application or service 612 and/or subscriber 602. In some embodiments, a singular route endpoint may be utilized to consolidate packets from multiple tunnels prior to handoff to the application or service 612. In further embodiments, route endpoint agent 610 may be operated in a same domain as the endpoint application or service 612 device (e.g., a public cloud) to avoid utilizing a singular route endpoint.

When utilizing a singular route endpoint agent 610, packet return paths may be defined independently of the packet arrival paths. In some instances, an optimal arrival path may differ from the optimal return path. These instances may be detected utilizing one-way path probing data. One-way probing of the performance of a path may allow for the detection of asymmetrical performance in arrival and return paths. For example, probing the latency of a network path in a first direction may reveal that it is an optimal path for packet arrival. However, probing the latency of that network path in a second direction may reveal that it is a sub-optimal path for packet return. Accordingly, packet streams may be routed down different paths for arrival verses return.

It bears repeating that while many of the examples described herein have focused on network latency as an example of the path probing data and/or the network performance metric being optimized for, other path performance metrics may similarly be optimized for. For example, different application or service QoE metrics such as jitter, packet loss, etc. may be optimized for in the same manner.

For instance, say that a packet stream is replicated over K paths, resulting in K packets arriving at distinct times. For jitter optimization, a packet that arrives over the tunnel closest to an observed interval may be the packet accepted. In some embodiments, after an initial learning phase it may be determined that packets of a packet stream are observed to arrive across the tunnel on an interval period $P=T \pm d$ ms. Based on this observation, jitter may be minimized by accepting the packet, from the K copies of the packet, arriving closest to the expected value of P. Therefore, utilizing packet stream replication across multiple tunnels and sequence numbering, outlier packets arriving outside an observed interval period may be filtered out, resulting in a more consistent packet stream.

Figure 7:
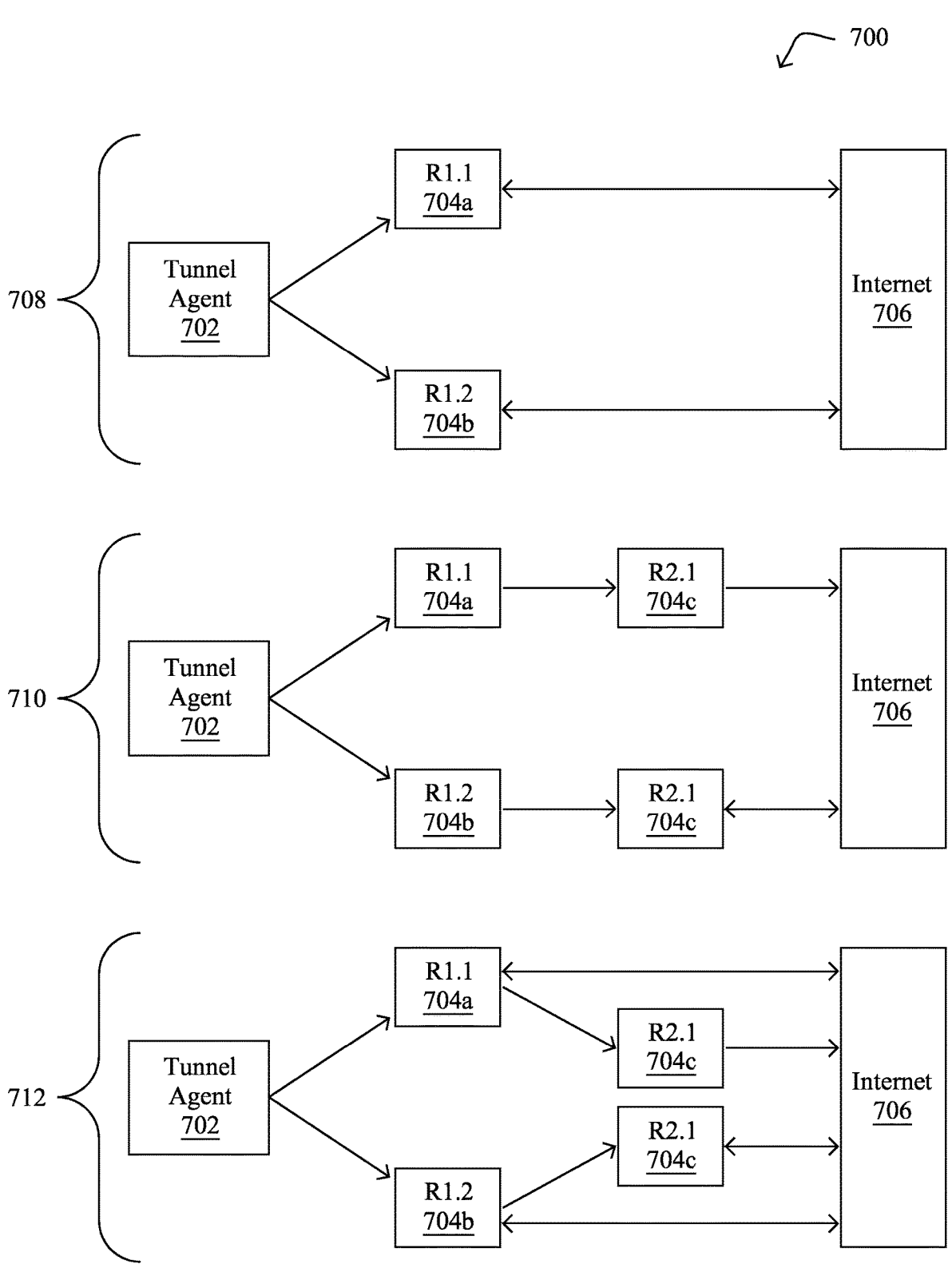
FIG. 7 illustrates example mappings for chaining multiple overlay tunnels for generating an elastic overlay network.

FIG. 7 illustrates example mappings 700 for chaining multiple overlay tunnels in generating an elastic overlay network, according to various embodiments. Specifically, mappings 700 includes path tree A 708, path tree B 710, and chained path tree A and B 712. In path tree A 708, tunnel agent 702 is communicably coupled to internet 706 through two tunnels. One of those tunnels includes relay R1.1 704a. The other of those tunnels includes relay R1.2 704b.

In path tree B 710, tunnel agent 702 is communicably coupled to internet 706 through two tunnels. One of those tunnels includes relay R1.1 704a and relay R2.1 704c. The other of those tunnels includes relay R1.2 704b and relay R2.1 704c.

In chained path tree A and B 712, tunnel agent 702 is communicably coupled to internet 706 through chained combinations of the tunnels in path tree A 708 and in path tree B 710. For example, each overlay path in chained path tree A and B 712 is made up of one or more tunnel segments. Each of the tunnel segments is made up of a tunnel from path tree A 708 and/or path tree B 710.

By chaining tunnels together in this manner, a more sophisticated traffic shaping is possible. For instance, by constructing a source routing encapsulation with nested tunnel headers, a path direction past the first relay hop may be influenced in chained paths. By combining multiple tunnel chains, a client can multiplex traffic at and past a first hop of the tunnel. For example, nested tunnel headers may be used to steer a packet either across the direct link between relay R1.1 704a to internet 706 or across relay R2.1 704c to internet 706 after reaching relay R1.1 704a in chained path tree A and B 712. The ability to multiplex traffic in this manner may mitigate hot-potato routing characteristics.

Figure 8:
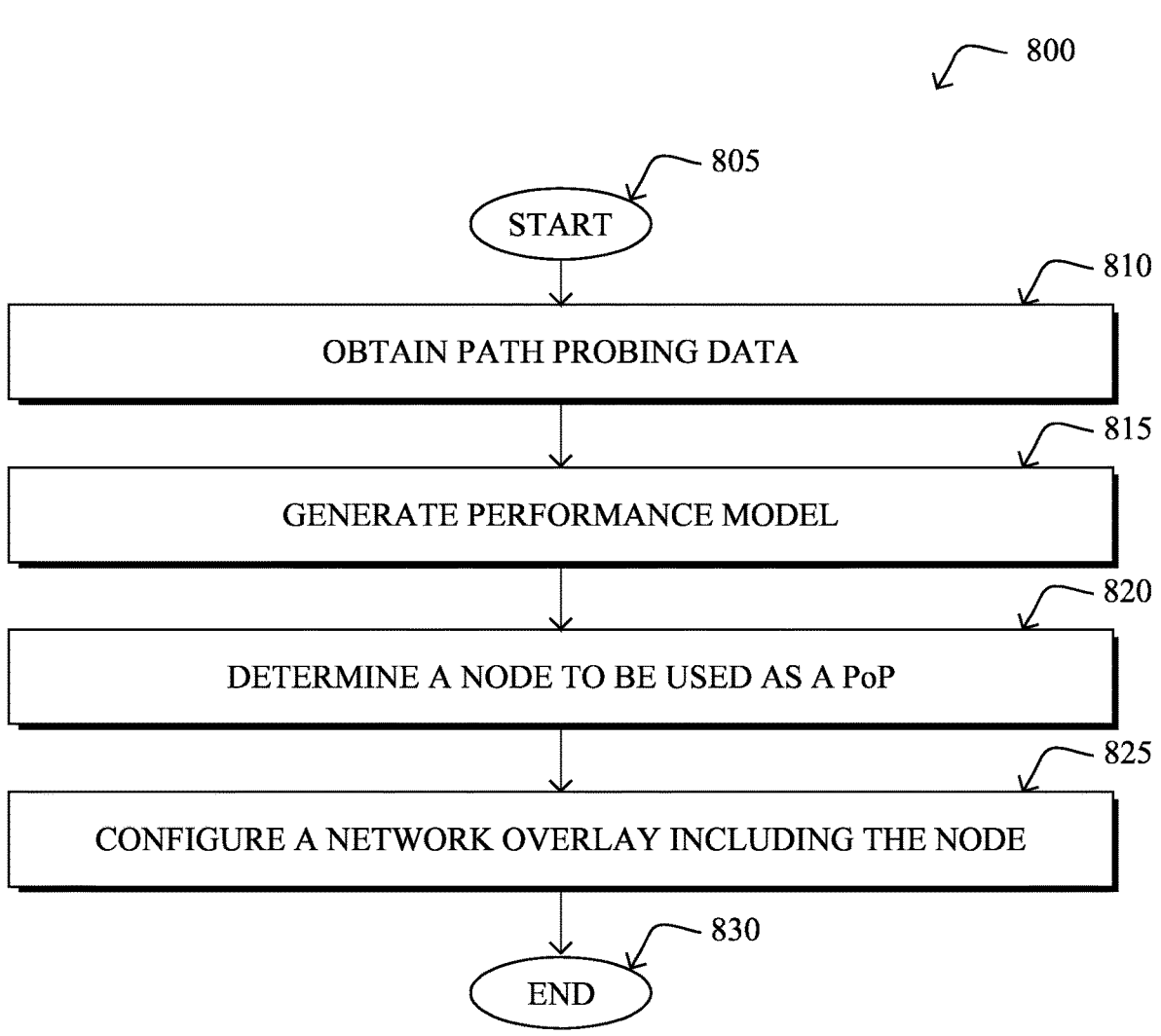
FIG. 8 illustrates an example simplified procedure for generating an elastic overlay network.

FIG. 8 illustrates an example simplified procedure 800 for elastic overlay network generation, in accordance with one or more embodiments described herein. For example, a non-generic, specifically configured device (e.g., device 200), such as controller for a network (e.g., an SDN controller or other device in communication therewith, a networking device, etc.), may perform procedure 800 by executing stored instructions (e.g., overlay generation process 248). The procedure 800 may start at step 805, and continues to step 810, where, as described in greater detail above, the device may obtain path probing data for paths between a set of network nodes. A first subset of the set of network nodes can be operated by a particular entity that provides an online application or service and a second subset of the set of network nodes operated by one or more affiliate entities. The path probing data may be data indicative of at least one of latency, packet loss, or jitter.

At step 815, as detailed above, the device may generate, based on the path probing data, a performance model that models path performances between clients located in different geolocations and the online application or service via each of the set of network nodes. The different geolocations may correspond to cities, metropolitan areas, states, or countries. In some embodiments, the different geolocations may be obtained based on internet protocol addresses of the clients.

At step 820, the device may determine, based on the performance model, that a particular node in the second subset should be used as a point of presence for clients located in a particular one of the different geolocations to access the online application or service, as described in greater detail above.

At step 825, as detailed above, the device may configure a network overlay that includes the first subset of the set of network nodes and the particular node in the second subset as points of presence for the online application or service. The device may configure the network overlay be instantiating oner or more virtual circuits between the particular node and those nodes in the first subset.

In some embodiments, device may configure the network overlay that includes the first subset of the set of network nodes and the particular node in the second subset as points of presence for the online application or service, when an expected traffic load for the clients located in the particular one of the different geolocations exceeds a predefined threshold. Additionally, the device may remove, based on the expected traffic load for the clients located in the particular one of the different geolocations being below the predefined threshold, the particular node in the second subset from the network overlay.

The clients in the particular one of the different geolocations may execute tunnel agents to select one or more of the points of presence in the network overlay to be utilized by those clients to access the online application or service. Further, the clients located in the particular one of the different geolocations may execute their tunnel agents to replicate packet streams to the online application or service via two or more of the points of presence in the network overlay. In some embodiments, the clients located in the particular one of the different geolocations may execute their tunnel agents to send packet streams to the online application or service via a path that chains together two or more of the points of presence in the network overlay. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, may generate elastic overlay networks that enhance online application or service QoE for latency critical domains such as fintech and multi-player gaming by providing optimized network paths provisioned on top of existing PoPs operated by third-party network presence affiliates. Additionally, these techniques enable cross-domain path selection, mitigating congestion and hot-potato routing characteristics. The technique generates rapid substantial network presence very quickly and with low capital expenditure. For example, the cost of utilizing third-party network presence affiliates to build and maintain the network presence is mitigated by updating the network topology of the overlay to fit client load, asserting that only the relays that participate in route optimization will be provisioned, and avoiding holding idle presence.

While there have been shown and described illustrative embodiments for elastic overlay network generation, it is to be understood that various other adaptations and modifications may be made within the spirit and scope of the embodiments herein. For example, while certain embodiments are described herein with respect to using certain models and network performance metrics for purposes of predicting network path performance, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, path probing data for paths between a set of network nodes wherein a first subset of the set of network nodes are operated by a particular entity that provides an online application or service and a second subset of the set of network nodes operated by one or more affiliate entities, wherein the one or more affiliate entities are operated independently from the online application;

generating, by the device and based on the path probing data, a performance model that uses a machine learning algorithm to model path performances between clients located in different geolocations and the online application or service via each of the set of network nodes;

determining, by the device and based on the performance model, that a particular node in the second subset should be used as a point of presence for clients located in a particular one of the different geolocations to access the online application or service;

configuring, by the device, a network overlay by instantiating one or more virtual circuits between the particular node in the second subset and those nodes in the first subset, wherein the network overlay includes the first subset of the set of network nodes and the particular node in the second subset as points of presence for the online application or service, in response to an expected traffic load for the clients located in the particular one of the different geolocations exceeding a predefined threshold; and removing, by the device and based on the expected traffic load for the clients located in the particular one of the different geolocations being below the predefined threshold, the particular node in the second subset from the network overlay.

2. The method as in claim 1, wherein the path probing data is indicative of at least one of latency, packet loss, or jitter.

3. The method as in claim 1, wherein the clients in the particular one of the different geolocations execute tunnel agents to select one or more of the points of presence in the network overlay to be utilized by those clients to access the online application or service.

4. The method as in claim 3, wherein the clients located in the particular one of the different geolocations execute their tunnel agents to replicate packet streams to the online application or service via two or more of the points of presence in the network overlay.

5. The method as in claim 3, wherein the clients located in the particular one of the different geolocations execute their tunnel agents to send packet streams to the online application or service via a path that chains together two or more of the points of presence in the network overlay.

6. The method as in claim 1, wherein the different geolocations correspond to cities, metropolitan areas, states, or countries.

7. The method as in claim 1, wherein the different geolocations of the clients are obtained based on internet protocol addresses of the clients.

8. An apparatus, comprising:

one or more network interfaces;

a processor coupled to the one or more network interfaces and configured to execute one or more processes; and a memory configured to store a process that is executable by the processor, the process when executed configured to:

obtain path probing data for paths between a set of network nodes wherein a first subset of the set of network nodes are operated by a particular entity that provides an online application or service and a second subset of the set of network nodes operated by one or more affiliate entities, wherein the one or more affiliate entities are operated independently from the online application;

generate, based on the path probing data, a performance model that uses a machine learning algorithm to model path performances between clients located in different geolocations and the online application or service via each of the set of network nodes;

determine, based on the performance model, that a particular node in the second subset should be used as a point of presence for clients located in a particular one of the different geolocations to access the online application or service;

configure a network overlay by instantiating one or more virtual circuits between the particular node in the second subset and those nodes in the first subset, wherein the network overlay includes the first subset of the set of network nodes and the particular node in the second subset as points of presence for the online application or service, in response to an expected traffic load for the clients located in the particular one of the different geolocations exceeding a predefined threshold; and removing, by the device and based on the expected traffic load for the clients located in the particular one of the different geolocations being below the predefined threshold, the particular node in the second subset from the network overlay.

9. The apparatus as in claim 8, wherein the path probing data is indicative of at least one of latency, packet loss, or jitter.

10. The apparatus as in claim 8, wherein the clients in the particular one of the different geolocations execute tunnel agents to select one or more of the points of presence in the network overlay to be utilized by those clients to access the online application or service.

11. The apparatus as in claim 10, wherein the clients located in the particular one of the different geolocations execute their tunnel agents to replicate packet streams to the online application or service via two or more of the points of presence in the network overlay.

12. The apparatus as in claim 10, wherein the clients located in the particular one of the different geolocations execute their tunnel agents to send packet streams to the online application or service via a path that chains together two or more of the points of presence in the network overlay.

13. The apparatus as in claim 8, wherein the different geolocations correspond to cities, metropolitan areas, states, or countries.

14. A tangible, non-transitory, computer-readable medium storing program instructions that cause a device to execute a process comprising:

obtaining, by the device, path probing data for paths between a set of network nodes wherein a first subset of the set of network nodes are operated by a particular entity that provides an online application or service and a second subset of the set of network nodes operated by one or more affiliate entities, wherein the one or more affiliate entities are operated independently from the online application;

generating, by the device and based on the path probing data, a performance model that uses a machine learning algorithm to model path performances between clients located in different geolocations and the online application or service via each of the set of network nodes;

determining, by the device and based on the performance model, that a particular node in the second subset should be used as a point of presence for clients located in a particular one of the different geolocations to access the online application or service;

configuring, by the device, a network overlay by instantiating one or more virtual circuits between the particular node in the second subset and those nodes in the first subset, wherein the network overlay includes the first subset of the set of network nodes and the particular node in the second subset as points of presence for the online application or service, in response to an expected traffic load for the clients located in the particular one of the different geolocations exceeding a predefined threshold; and removing, by the device and based on the expected traffic load for the clients located in the particular one of the different geolocations being below the predefined threshold, the particular node in the second subset from the network overlay.

*    *    *    *    *